United States Patent [19]

Rourke et al.

[11] Patent Number: 5,019,362

[45] Date of Patent: May 28, 1991

[54] ION EXCHANGE METHOD FOR THE PURIFICATION OF SCANDIUM

[75] Inventors: William J. Rourke, Worcester; Samuel Natansohn, Sharon, both of Mass.

[73] Assignee: GTE Laboratories Incorporated, Waltham, Mass.

[21] Appl. No.: 423,312

[22] Filed: Oct. 18, 1989

[51] Int. Cl.$^5$ .............................................. C01F 17/00
[52] U.S. Cl. .................................... 423/21.5; 423/263
[58] Field of Search ............ 423/21.5, 263, DIG. 14; 75/101 BE; 210/672, 681, 688

[56] References Cited

U.S. PATENT DOCUMENTS

| | | | |
|---|---|---|---|
| 2,897,050 | 7/1959 | Jaffe | 423/21.5 |
| 3,146,063 | 8/1964 | Moore et al. | 423/21.5 |
| 4,572,581 | 2/1986 | Horton | 299/4 |
| 4,711,768 | 12/1987 | Peterson et al. | 423/21.5 |
| 4,718,996 | 1/1988 | Vanderpool et al. | 423/21.5 |
| 4,765,909 | 8/1988 | Rourke et al. | 423/21.5 |
| 4,808,384 | 2/1989 | Vanderpool et al. | 423/21.5 |
| 4,816,233 | 3/1989 | Rourke et al. | 423/21.5 |

OTHER PUBLICATIONS

Amblerlite © Ion Exchange Resins, Rohm and Haas Company, 1975.
Amberlite © IR-118, Technical Bulletin, Rohm and Haas Company, 1974.
Amberlite © Ion Exchange Resins, Fluid Process Chemicals and Apparatus, Technical Bulletin Fluid Process Chemicals, Rohm and Haas Copy 1983.

*Primary Examiner*—Michael L. Lewis
*Assistant Examiner*—Steven Bos
*Attorney, Agent, or Firm*—Carl F. Ruoff

[57] ABSTRACT

A process is disclosed for purifying scandium from an acid solution containing scandium and various impurities. The process involves mixing the acid solution with a chelating resin in the hydrogen form to from a slurry and packing the slurry in a short ion exchange column. The ion exchange column is rinsed with a mineral acid and the scandium is removed by passing diglycolic acid through the column. The diglycolic acid containing scandium is then passed through a chelating resin in the H form. When the scandium concentration in the effluent from the chelating resin reaches a preselected level the effluent of digylcolic acid and scandium is collected. Collection is stopped when the scandium concentration in the eluent falls below a preselected level. This collected eluent is passed through a strong cation exchange column where the scandium is collected. After rinsing the strong cation exchange column with deionized water, the scandium is removed from the column by passing a solution of ammonium nitrate through the strong cation exchange resin. The scandium is precipitated from the ammonium nitrate by adding oxalic acid. The precipate of scandium oxalate is collected by filtration and rinsed. The precipate is calcined at approximately 975° C. to form scandium oxide. This process is applicable to the recovery and purification of scandium from any acid soluble matrix.

14 Claims, No Drawings

ION EXCHANGE METHOD FOR THE PURIFICATION OF SCANDIUM

BACKGROUND OF THE INVENTION

Advances in material science have made possible the production of new materials with a wide variety of novel and desirable properties. These achievements, especially in the field of solid state devices such as semiconductors, depend on very precise control of composition. Crystals of silicon and gallium arsenide are "doped" with impurities at the part per million level or lower to attain the desired semiconductor properties. Obviously, the success of such work relies on the availability of starting materials; silicon, gallium, arsenic, etc. of extremely high purity. As new solid state materials are developed, there is an accompanying demand for various chemical elements in increasingly higher degrees of purity. For some of the less common elements, existing methods of purification may be inadequate in terms of the level of purity obtained or they may be tedious and inconvenient. One such element is the metal scandium, which has found minimal use in industry to date. The present state of the art, as described by L. A. Herchenroeder, et al., at the 17th Rare Earth Research Conference, McMaster University, Hamilton, Ontario, June 9-12, 1986, although capable of delivering adequately pure scandium, is unrealistically complex. The process requires ion exchange chromatography on a strong cation exchanger at the impractical temperature of 96° C. The process takes weeks, if not months, and the entire bank of ion exchange columns must be kept in a "hot room" throughout. The procedure of the instant invention eliminates the need for elevated temperature, permitting the purification of scandium to be carried out conveniently at room temperature.

SUMMARY OF THE INVENTION

In accordance with one aspect of the invention, there is provided a process for recovering and purifying scandium from impure scandium bearing material. The process involves dissolving the scandium bearing material in an acid solution and adjusting the pH to between 3.0 and 3.5. The solution is filtered if suspended matter is present. A chelating resin is added to the solution, the mixture is stirred, and the pH is again adjusted, this time to between 1.9 and 2.1. The resin and solution are packed into a short ion exchange column. The pH adjusted solution is drawn through the column and then the column is rinsed with dilute hydrochloric or nitric acid solution with about 100 to 200 bed volumes of mineral acid solution. At this point, the resin of the column contains scandium along with certain other metals. These other metals are separated from the scandium by eluting the scandium from the short column with a chelating agent solution and passing this solution through a long column packed with an ion exchange resin. After the scandium has been completely transferred to the long column, it is eluted from the long column by passing a chelating agent solution such as diglycolic acid through the column. The early portion and late portion of this solution is discarded as these fractions contain "high" concentrations of unwanted metal ions and "low" concentrations of scandium. The scandium is separated from the saved diglycolic acid solution by passing this solution through a strong cation exchange column which absorbs the scandium. The scandium is subsequently recovered by passing a solution of ammonium nitrate through the strong cation exchange column. The scandium contained in the ammonium nitrate solution is precipitated by addition of oxalic acid. The precipitate is filtered, washed and dried leaving a solid of scandium oxalate. This can be converted to scandium oxide by calcination at an elevated temperature.

It is therefore an object of the present invention to prepare high purity scandium oxide.

Yet another object of the present invention is to prepare purified scandium without requiring heated chromatography columns.

For a better understanding of the present invention, together with other and further objects, advantages and capabilities thereof, reference is made to the following detailed description and appended claims in connection with preceding description of some aspects of the invention.

DETAILED DESCRIPTION OF THE INVENTION

This invention addresses the problem of purifying scandium from any source to the high degree required for use in advanced solid state devices, such as semiconductors, superconductors or lasers. The impure scandium can be in the form of the metal, the oxide or any other chemical compound which can be dissolved in an aqueous acid.

The process is an ion-exchange method. Ion exchange in general is well suited to purification problems since it can be performed chromatographically, that is the separation between two chemical elements achieved when solution and resin come into equilibrium can be multiplied over and over again. Until the advent of ion exchange chromatography, the problem of complete separation of the rare earth elements from one another was nearly intractable. While the current state of the art in scandium purification is an ion exchange chromatographic method, the instant invention represents a significant advance by capitalizing on a very specific interaction between scandium and an ion exchange resin having iminodiacetic acid functional groups.

The equilibrium distribution of a metal ion between the solution phase and the resin phase is characterized by a so-called distribution coefficient $K_d$ defined as the ratio of the concentration of the metal on the resin to that in the solution phase. This distribution coefficient is a function of the hydrogen ion concentration of the aqueous phase. For the weakly acidic iminodiacetic acid groups, this variation can be manipulated more subtly than for the case of the strongly acidic sulphonic acid functional group. The latter retains essentially all metals quite strongly, that is $K_d \gg 1$, so that all the separation from other metals must be accomplished chromatographically. The former, is far more selective and at appropriate pH conditions, retains scandium and a small number of other metals quite strongly while the majority, comprising the alkali metals, alkaline earths, the rare earths and many divalent transition metals are retained so weakly ($K_d$ approaching 1) that even when adsorbed, can be rinsed from the resin easily without concomitant loss of scandium. This greatly reduces the dimension of the separation problem.

An illustrative and useful, but not sole implementation of this invention is the purification of scandium oxide commercially available, but having an unacceptable level of contamination.

In order to separate the impurities from the scandium, it is necessary to bring it into a soluble form so as to make it amenable to the ion exchange technique. In the case of scandium oxide ($Sc_2O_3$) heating with a solution of mineral acid in water is a satisfactory technique. While almost any concentration will suffice to dissolve the oxide, it is desirable in terms of subsequent operations that the solution not be too concentrated. Typical solvents would be nitric or hydrochloric acid in the 10–25% (vol/vol) range.

The dissolution of $Sc_2O_3$ is somewhat slow and it is advantageous to be certain that complete dissolution has taken place. For comparatively pure samples of $Sc_2O_3$ this is not difficult for clear homogeneous solutions of $Sc^{+3}$ result. Less pure starting materials give colored and, not infrequently, hazy solutions. In that case, the solution should be filtered and the suspended material discarded.

After the impure $Sc_2O_3$ has been dissolved to give a solution, clear or colored, it must be adjusted to a pH of 2.05–3.5, preferably 3–3.5 by addition of an alkali solution such as sodium hydroxide. The concentration of the latter is immaterial, although the higher it is the more difficult the pH control will be. A concentration of 1 Mole/Liter is convenient.

Once the pH of the scandium solution has been brought to 2.05–3.5, preferably 3–3.5, the solution is allowed to come to equilibrium with a suitable quantity of the chelating resin in the hydrogen form by adding the resin to the pH adjusted solution and stirring. As the solution and resin come into equilibrium, the pH of the solution decreases because of the displacement of hydrogen ion by the scandium ion.

A final adjustment of system pH to the 1.9–2.25 range, preferably the 1.9–2.1 range is accomplished by the addition of 1M sodium hydroxide.

The resulting slurry of pH adjusted solution and ion exchange resin is used to pack an ion exchange column. The slurry is poured into a column preferably having as large a ratio of cross-sectional area to length as possible. As short a resin bed as possible is advantageous in the purification step to follow.

After the column has been packed, the pH adjusted solution is slowly drawn off the bottom of the column and simultaneously elution of the resin with dilute sulfuric, hydrochloric or nitric acid of pH 2.0 is begun. In this rinsing stage, those metals retained by the resin less strongly than scandium are preferentially removed as they distribute from the resin to the aqueous phase. This rinsing stage is important in terms of the purity of the final product and should be carried out with about 100 to 200 bed volumes of rinsing acid.

After the rinsing step has been completed, there remains on the resin a subset of the metal ions present in the original solution obtained upon dissolution of the impure scandium. In addition to the scandium, certain other metals such as copper, chromium, iron (III), thorium and uranium will also remain on the resin at this point if they were originally present. These metals, like scandium, have high distribution coefficients with the chelating resin at this pH. Further purification of the scandium requires separation from these metals, and this is accomplished by chromatographic elution of the scandium from the resin with a solution of a chelating agent. Unlike the rinsing stage where a very short resin bed is advantageous, the elution stage requires a long resin bed to be effective. In the case of rinsing, it is desired to remove many metals, but there is no requirement that they be separated from one another. During the elution of scandium with a chelating agent, on the other hand, it is imperative that the separation of scandium from any other metals which are also eluted by the chelating agent be maximized. This separation takes place as the equilibrium of the metals between the aqueous phase and the stationary phase is repetitively established while the aqueous phase passes through the ion exchange resin bed. Any difference in the distribution coefficients of the metals to be separated (e.g. scandium and thorium) results in the development of bands of concentration of the metals on the resin. All other things being equal, the longer the column the greater the separation of these bands.

The transition from one column configuration (short) to the other (long resin bed) can be accomplished in one of two ways. The first is to physically transfer the rinsed resin from the short, wide column to the top of a long ion exchange column already substantially packed with ion exchange resin of the iminodiacetic acid type in the hydrogen form. This results in an ion exchange column with a sharply defined band of scandium at the top, the ideal starting point for chromatographic elution.

An alternative way to switch from the rinsing mode to the elution mode of operation is to elute the scandium from the short column with a solution of the chelating agent when rinsing has been completed. The effluent stream, consisting of scandium and chelating agent solution is directed to the top of a long column containing the iminodiacetic acid resin in the hydrogen form. When the scandium has been completely eluted from the short column, the connection is broken and the chromatography continued by pumping the chelating agent solution directly into the long column. The choice of method will be dictated by circumstances, as each has advantages and disadvantages. The physical transfer of resin results in a sharper band of scandium, but is more labor intensive. The possibilities for loss of resin through spillage and/or the introduction of contamination must be considered as well. The transfer by elution, on the other hand, will result in a wider scandium band (thus greater overlap with impurity bands) but the elimination of the possibility of loss or contamination as well as the elimination of manual transfer may make this method better suited for industrial work.

Once the scandium has been transferred to the long column, it is eluted by passage of a suitable chelating agent solution. A very satisfactory elution agent is diglycolic acid, of concentration in the range 0.01M to 1M with 0.1M, being typical. If the concentration of scandium in the column effluent is measured at intervals, it is found to be zero initially, but after some time which is dependent on the column dimensions, the flow rate and the chelating agent concentration, it begins to rise. It is advantageous to discard the earliest portions of the elution solution to minimize the incorporation of impurities which may have been eluted ahead of the scandium peak. In essence the elution solution is collected when the scandium concentration rises above a preselected level. Taking as product only a narrow band centered on the maximum in scandium concentration (the "heart-cut" technique) will maximize purity at the expense of yield.

A similar decision must be made on the trailing end of the peak. Collecting the effluent until the scandium concentration returned to near zero would maximize the incorporation of impurities being eluted off the column after the scandium peak. Thus the effluent is collected until the scandium concentration drops below a preselected level.

The column effluent, a solution of scandium in diglycolic acid is substantially free of contaminating metal ions, but preparation of scandium from the solution of diglycolic acid by the addition of oxalic acid is inhibited by the presence of carboxylic acids, so the scandium and diglycolic acid must be separated.

The precipitation of scandium as hydroxide by addition of alkali is not inhibited, but the gelatinous nature of the product makes it impossible to handle conveniently. A further drawback is the absorption of trace metals present on the hydroxide precipitate, especially if sodium or potassium hydroxide is used as the precipitant.

The separation of scandium from diglycolic acid is accomplished readily by passing the solution through a strong cation exchange resin (sulfonic acid functionality) in the hydrogen form. This results in the retention of scandium on the resin while the diglycolic acid passes through to be discarded or recycled.

The scandium on the strong cation exchange resin is subsequently eluted with a concentrated solution of ammonium nitrate, a concentration of 4M is found to be satisfactory. The resulting solution of scandium in ammonium nitrate solution is amenable to precipitation of scandium oxalate upon addition of oxalic acid unlike the solution of scandium and diglycolic acid. After precipitation, the scandium oxalate is separated from the solution by filtration and rinsed with distilled water. The oxalate can then be converted to the oxide readily by calcination at an elevated temperature (975° C.) in a furnace. The use of ammonium nitrate is a measure taken to eliminate contamination of the scandium oxalate crystals by absorption of counter ions on the surface. While there will inevitably be some amount of the common cations (e.g. sodium, calcium, magnesium, chloride, etc.) in the solution, their absorption on the surface of the crystals of scandium oxalate can be minimized by the presence of overwhelmingly more ammonium and nitrate ions in the solution. Then, during the calcination of oxalate to oxide, while absorbed sodium or chloride ions would remain in the product, absorbed ammonium or nitrate ions will be volatilized as $NH_3$ and $HNO_3$ respectively.

EXAMPLE 1

A portion of commercially available $Sc_2O_3$ weighing 2.0276 g nominally 99.9% pure was dissolved in 1N HCl with heating. When dissolution was complete, the pH of the solution was brought to 2.05 with 1N NaOH. To this solution was added 200–300 grams of Amberlite ® IRC-718 ion exchange resin having iminodiacetic acid functionality in the hydrogen form.

The slurry of resin and liquid was transferred to an ion exchange column having an inside diameter of 3 inches which resulted in a resin bed about 3 inches tall. The supernatant liquid was drawn off through a stopcock at the bottom of the column and simultaneously rinsing was begun with dilute $H_2SO_4$. The dilution of the sulfuric acid was such that the pH was 2.0.

A total of 44.5 liters of dilute sulfuric acid was passed through the column and discarded. When the rinsing operation was finished, the scandium loaded resin was transferred to the top of an ion exchange column 100 cm in length and 2.5 cm in diameter which was already partially filled with chelating resin in the hydrogen form. In this way a column filled with resin and having a band of absorbed scandium at the top was obtained.

A connection between the bottom of this column to the top of a second 100 cm column filled entirely with clean hydrogen form resin was made, and the bottom of this second column was connected to the top of a third such column. Thus, a chromatographic column 300 cm by 2.5 cm diameter was obtained.

Once the chromatographic columns were set up elution with 0.025M diglycolic acid was begun. The effluent from the third column was assayed for scandium at intervals. When the scandium concentration began to rise sharply, the effluent stream was directed to the top of an ion exchange column filled with a strong cation exchange resin having sulfonic acid functionality [Amberlite ® IR-118] which was in the hydrogen form. The elution from the chromatographic columns was complete after passing 12 liters of the elute as evidenced by the fact that the scandium concentration in the 300 cm column effluent has fallen to 0.7 ppm. No detectable scandium passed through the strong cation exchange column indicating that all the scandium eluted from the chromatographic column was retained.

The scandium loaded strong cation exchange column was rinsed with 2 liters of deionized water to remove traces of diglycolic acid. The absorbed scandium was then displaced from the resin with a 4M solution of ammonium nitrate. When a total of 850 ml of ammonium nitrate had passed through the column 4.0 grams of ACS reagent grade oxalic acid was added to the solution. A copious precipitate of scandium oxalate formed immediately.

The precipitate was digested overnight at 40° C. The fine microcrystalline solid was filtered off and rinsed with cold distilled water. The scandium oxalate was then removed from the filter paper and calcined in an alumina boat at 975° C. The product obtained was analyzed by mass spectrometry. A portion of the 99.9% $Sc_2O_3$ starting material was also analyzed by mass spectrometry. These results, shown in Table 1 indicate that substantial purification has been achieved.

TABLE 1

| | PURIFICATION OF 99.9% $Sc_2O_3$ | |
|---|---|---|
| IMPURITY | STARTING MATERIAL (ppm) | PURIFIED MATERIAL (ppm) |
| Na | 26.2 | <10 |
| Mg | 4.1 | <4 |
| Al | 2.8 | <10 |
| Si | 16.8 | <20 |
| Ti | 3.7 | 0.5 |
| V | 0.04 | <0.01 |
| Cr | 0.27 | <1 |
| Fe | 2.3 | |
| Mn | 0.1 | <0.30 |
| Co | <0.02 | <0.5 |
| Ni | 0.28 | |
| Cu | 0.28 | |
| Zn | 0.06 | <0.4 |
| Y | | 0.2 |
| Zr | 4.3 | <0.2 |
| Nb | 0.36 | <0.01 |
| Mo | 0.45 | <0.03 |
| Ce | 1.8 | 0.06 |
| Pr | 22.7 | <0.01 |
| Nd | 3.6 | <0.01 |
| Sm | 1.8 | <0.02 |
| Eu | 0.51 | <0.01 |
| Gd | 113.5 | <0.02 |
| Tb | 1.8 | <0.01 |
| Dy | 15.9 | <0.02 |
| Ho | 3.5 | <0.01 |
| Er | 12.4 | <0.01 |
| Tm | 2.8 | 0.1 |
| Yb | 33.6 | <0.01 |
| Lu | 7.3 | <0.01 |

TABLE 1-continued

PURIFICATION OF 99.9% $Sc_2O_3$

| IM-PURITY | STARTING MATERIAL (ppm) | PURIFIED MATERIAL (ppm) |
|---|---|---|
| W | 0.13 | 0.8 |
| Th | 56.0 | <0.01 |
| U | <0.02 | <0.01 |

EXAMPLE 2

A portion of crude $Sc_2O_3$ weighing 2.1650 grams was dissolved in 25% $HNO_3$ with heating. This crude $Sc_2O_3$ was not a commercial sample, but an impure preparation from a low grade source (wolframite processing residue). When dissolution was complete, the pH was adjusted to 3.25 with 1M NaOH and made up to 500 ml in volume. The scandium concentration of this solution was found to be 2613 ppm. To this solution was added 115 g air dried chelating ion exchange resin. The pH fell from 3.25 to 1.65 within a few minutes as scandium ions were absorbed on the resin simultaneously displacing hydrogen ions. The pH was adjusted to 2.25 by addition of a little 1M NaOH solution and the slurry of resin was poured into an ion exchange column 3 inches in inside diameter. The scandium loaded resin formed a layer about 3 inches tall.

The supernatant liquid was drawn off through a stopcock at the bottom of the column and rinsing with dilute nitric acid (pH 2.0) was begun. A total of 92.5 liters of rinsing acid was passed through the column.

When the rinsing was complete the scandium was eluted from the resin with 0.02M diglycolic acid. The effluent stream of scandium and diglycolic acid was directed to the top of a chromatographic column set up. This consisted of 3 100 cm columns filled with a chelating ion exchange resin as described in Example 1. Pumping of the 0.02M diglycolic acid was continued until the scandium peak had emerged from the end of the chromatographic column series.

The solution of scandium and diglycolic acid emerging from the chromatographic column was passed through an ion exchange column filled with a strong cation exchange resin [Amberlite ® IR-118] where the Sc was quantitatively retained. The scandium absorbed on the strong cation exchange resin was then displaced with a solution of 4M ammonium nitrate. To the 1 liter of scandium and ammonium nitrate was added 6 grams of ACS reagent grade oxalic acid dihydrate. The precipitate of scandium oxalate was allowed to digest overnight at moderate temperature ($\simeq$30° C.). The microcrystalline scandium oxalate was then collected by filtration, rinsed with cold distilled water and converted to the oxide by calcination at 975° C. The product obtained, as well as a portion of the starting material, were analyzed by mass spectrometry. The results, shown in Table 2, prove that significant purification has been accomplished with respect to all elements present. Particularly impressive is the quantitative removal of the lanthanide elements and thorium which is most difficult because of the similarity of the chemical behavior of these elements.

TABLE 2

PURIFICATION OF CRUDE $Sc_2O_3$ MATERIAL

| IMPURITY | BEFORE PURIFICATION (ppm) | AFTER PURIFICATION (ppm) |
|---|---|---|
| Na | 2760 | 84.7 |
| Mg | 79 | 7.6 |
| Al | 73 | 28.7 |
| Si | 716 | 64 |
| Ti | 33 | 1.73 |
| V | 16 | 0.04 |
| Cr | 7 | 2.53 |
| Mn | 298 | 0.57 |
| Fe | 166 | 12.33 |
| Ni | 86 | 0.48 |
| Co | 47 | <0.08 |
| Cu | 1.5 | 6.53 |
| Zn | 47 | 10.57 |
| Zr | 28 | 4.4 |
| Nb | 17 | 0.24 |
| Mo | 16 | <0.3 |
| W | 41 | nd |
| Th | 2330 | 3.4 |
| Ce | 4900 | nd |
| Pr | 759 | nd |
| Nd | 3060 | nd |
| Sm | 1280 | nd |
| Eu | 38 | nd |
| Gd | 1080 | nd |
| Tb | 131 | nd |
| Dy | 533 | nd |
| Ho | 91 | nd |
| Er | 318 | nd |
| Tm | 49 | nd |
| Yb | 394 | nd |
| Lu | 63 | nd |
| U | 3.6 | nd |

Comparison of the results of Table 2 with the results in Table 1 reveals that essentially the same product purity is attained despite the tremendous differences in starting material purity. Furthermore, this purification is attained in a short time (about 2 weeks) at room temperature. Therefore, this process is suitable for purifying scandium from essentially any source to a consistently high degree of purity. This purification is accomplished in less time than the present state of the art (two weeks vs. a month or more) and furthermore the entire process is carried out at room temperature instead of 95° C.

While there has been shown and described what are at present considered the preferred embodiments of the present invention, it will be obvious to those skilled in the art that various changes, alterations and modifications may be made therein without departing from the scope of the invention as defined by the appended claims.

What is claimed is:

1. A process for purifying scandium comprising:
   (a) adjusting the pH of an aqueous solution containing scandium with base to between approximately 2.05 and 3.5;
   (b) adding a chelating resin having an iminodiacetic acid functionality in the hydrogen form to the aqueous solution containing scandium and allowing the resulting slurry to equilibrate;
   (c) adjusting the pH of the slurry containing scandium and chelating resin with base to between approximately 1.9 to 2.25;
   (d) collecting the slurry from step (c) and drawing off the solution;
   (e) rinsing the collected slurry with dilute mineral acid in an amount sufficient to remove metals retained by the resin less strongly than scandium;

(f) passing diglycolic acid through the collected slurry to remove the scandium absorbed on the chelating resin and collecting the diglycolic acid containing scandium;

(g) passing the diglycolic containing scandium through a chelating resin having an iminodiacetic acid functionality in the hydrogen form;

(h) collecting the diglycolic acid coming out of the chelating resin;

(i) passing the diglycolic acid collected from step (h) through a strong cation exchange resin having a sulphonic acid functionality wherein the scandium is absorbed;

(j) passing an ammonium nitrate solution through the strong cation exchange resin having a sulphonic acid functionality and collecting the resulting solution of ammonium nitrate containing scandium;

(k) adding oxalic acid to the collected ammonium nitrate solution containing scandium to form a precipitate of scandium oxalate; and (l) collecting the scandium oxalate precipitate.

2. The method according to claim 1 further comprising:

(m) calcining the scandium oxalate precipitate at a sufficient temperature and period of time to form scandium oxide.

3. The method according to claim 1 wherein the chelating resin in the hydrogen form in step (b) is Amberlite ® IRC-718.

4. The method according to claim 1 wherein the chelating resin in the hydrogen form in step (g) is Amberlite ® IRC-718.

5. The method according to claim 1 wherein the strong cation exchange resin in step (j) is Amberlite ® IR-118.

6. A process for purifying scandium comprising:

(a) adjusting the pH of an aqueous solution containing scandium with base to between approximately 2.05 and 3.5;

(b) adding a chelating resin having an iminodiacetic acid functionality in the hydrogen form to the aqueous solution containing scandium and allowing the resulting slurry to equilibrte;

(c) adjusting the pH of the slurry containing scandium and chelating resin with base to between approximately 1.9 and 2.25;

(d) collecting the slurry from step (c) and drawing off the solution;

(e) rinsing the collected slurry with mineral dilute acid in an amount sufficient to remove metals retained by the resin less strongly than scandium;

(f) passing diglycolic acid through the collected slurry to remove the scandium absorbed on the chelating resin and collecting the diglycolic acid containing scandium;

(g) passing the diglycolic containing scandium through a chelating resin having an iminodiacetic acid functionality in the hydrogen form until the scandium concentration in the diglycolic acid begins to increase;

(h) collecting the diglycolic acid coming out of the chelating resin until the scandium concentration in thee diglycolic acid falls to a level of approximately 0.7 ppm;

(i) passing the diglycolic acid collected from step (h) through a strong cation exchange resin having a sulphonic acid functionality wherein the scandium is absorbed;

(j) passing an ammonium nitrate solution through the strong cation exchange resin having a sulphonic acid functionality and collecting the resulting solution of ammonium nitrate containing scandium;

(k) adding oxalic acid to the collected ammonium nitrate solution containing scandium to form a precipitate of scandium oxalate; and (l) collecting the scandium oxalate precipitate.

7. The method according to claim 6 further comprising; (m) calcining the scandium oxalate precipitate at a sufficient temperature and period of time to form scandium oxide.

8. The method according to claim 6 wherein the chelating resin in the hydrogen form in step (b) is Amberlite ® IRC-718.

9. The method according to claim 6 wherein the chelating resin having an iminodiacetic acid functionality in the hydrogen form in step (g) is Amberlite ® IRC-718.

10. The method according to claim 6 wherein the strong cation exchange resin in step (j) is Amberlite ® IR-118.

11. A process for purifying scandium comprising:

(a) adjusting the pH of an aqueous solution containing scandium with base to between approximately 2.05 and 3.5;

(b) adding a chelating resin having an iminodiacetic acid functionality in the hydrogen form to the aqueous solution containing scandium and allowing the resulting slurry to equilibrate;

(c) adjusting the pH of the slurry containing scandium and chelating resin with base to between approximately 1.9 and 2.25;

(d) collecting the slurry from step (c) and drawing off the solution;

(e) rinsing the collected slurry with mineral dilute acid in an amount sufficient to remove metals retained by the resin less strongly than scandium;

(f) passing diglycolic acid through the collected slurry to remove the scandium absorbed on the chelating resin in step (b) and through a chelating resin having an iminodiacetic acid functionality in the hydrogen form;

(g) collecting the diglycolic acid which has passed through the chelating resin having an iminodiacetic acid functionality in the hydrogen form;

(h) passing the diglycolic acid collected from step (g) through a strong cation exchange resin having a sulphonic acid functionality wherein the scandium is absorbed;

(i) passing an ammonium nitrate solution through the strong cation exchange resin having a sulphonic acid functionality and collecting the resulting solution of ammonium nitrate containing scandium;

(j) adding oxalic acid to the collected ammonium nitrate solution containing scandium to form a precipitate of scandium oxalate; and (k) collecting the scandium oxalate precipitate.

12. The method according to claim 11 further comprising; (l) calcining the scandium oxalate precipitate at a sufficient temperature and period of time to form scandium oxide.

13. The method according to claim 11 wherein the chelating resin in the hydrogen form in step (b) is Amberlite ® IRC-718.

14. The method according to claim 11 wherein the strong cation exchange resin in step (i) is Amberlite ® IR-118.

* * * * *